United States Patent
McConnell

(10) Patent No.: US 7,920,620 B1
(45) Date of Patent: Apr. 5, 2011

(54) METHOD FOR REDUCING THE CALCULATION COMPLEXITY FOR CODE ACQUISITION AND CORRELATION

(75) Inventor: Richard Joseph McConnell, Rancho Cucamonga, CA (US)

(73) Assignee: SiRF Technology, Inc., San Jose, CA (US)

( * ) Notice: Subject to any disclaimer, the term of this patent is extended or adjusted under 35 U.S.C. 154(b) by 1433 days.

(21) Appl. No.: 09/967,136

(22) Filed: Sep. 27, 2001

Related U.S. Application Data

(63) Continuation of application No. 60/236,358, filed on Sep. 27, 2000.

(51) Int. Cl.
H04B 1/707 (2006.01)

(52) U.S. Cl. ........................................... 375/149

(58) Field of Classification Search ............ 375/149, 375/150, 140, 130, 145, 147, 316
See application file for complete search history.

(56) References Cited

U.S. PATENT DOCUMENTS

| | | | | |
|---|---|---|---|---|
| 4,894,842 | A * | 1/1990 | Broekhoven et al. | 375/1 |
| 6,285,655 | B1 * | 9/2001 | Lundby et al. | 370/209 |
| 6,370,208 | B1 * | 4/2002 | Kuo et al. | 375/343 |
| 6,650,879 | B1 * | 11/2003 | Underbrink | 455/255 |
| 6,778,587 | B1 * | 8/2004 | Malvar et al. | 375/130 |
| 6,792,031 | B1 * | 9/2004 | Sriram et al. | 375/147 |
| 7,130,332 | B1 * | 10/2006 | Shenoi | 375/150 |
| 2002/0118730 | A1 * | 8/2002 | Svensson et al. | 375/150 |

* cited by examiner

*Primary Examiner* — Kevin M Burd
(74) *Attorney, Agent, or Firm* — Mark J. Danielson; Pillsbury Winthrop Shaw Pittman LLP

(57) ABSTRACT

The present invention determines those mathematical processes that are repeated in the standard search schema, and uses this information to simplify the process by eliminating repetition of processes that have already been performed. The present information can be implemented in standard circuitry and with fewer instructions than the standard approach. As such, the present invention allows for receiver implementations that are of lower cost and lower power consumption, while achieving the same functionality as the standard receiver topology. The present invention achieves these goals by forming a lookup table of partial accumulations, and presents a method to efficiently address these partial accumulations for use during the accumulation and correlation processes performed by the receiver. These partial accumulations are in turn added together, or accumulated, to form the total accumulation over the desired time period. This eliminates the need of a specific operation of multiplication, or equivalent, on the incoming data. The present invention details a method for grouping similar operations, and presents a series of operations to utilize these groups for replacing a portion of the correlations and additions that would be carried out in the classical approach.

10 Claims, 6 Drawing Sheets

|    | C0    | C1    | C2    | C3    | etc |
|----|-------|-------|-------|-------|-----|
| D0 | D0xC0 | D0xC1 | D0xC2 | D0xC3 | etc |
| D1 | D1xC0 | D1xC1 | D1xC2 | D1xC3 | etc |
| D2 | D2xC0 | D2xC1 | D2xC2 | D2xC3 | etc |
| D3 | D3xC0 | D3xC1 | D3xC2 | D3xC3 | etc |

FIG. 6

|      | Code | |
|------|---|---|
|      | 0 | 1 |
| 0 | 0 | F |
| 1 | 1 | E |
| 2 | 2 | D |
| 3 | 3 | C |
| 4 | 4 | B |
| 5 | 5 | A |
| 6 | 6 | 9 |
| 7 | 7 | 8 |
| 8 | 8 | 7 |
| 9 | 9 | 6 |
| A | A | 5 |
| B | B | 4 |
| C | C | 3 |
| D | D | 2 |
| E | E | 1 |
| F | F | 0 |

(Row label: Data)

FIG. 7

METHOD FOR REDUCING THE CALCULATION COMPLEXITY FOR CODE ACQUISITION AND CORRELATION

CROSS-REFERENCE TO RELATED APPLICATIONS

This application claims priority under 35 U.S.C. §119(e) of U.S. Provisional Patent Application No. 60/236,358, filed Sep. 27, 2000, entitled "METHOD FOR REDUCING THE CALCULATION COMPLEXITY FOR CODE ACQUISITION AND CORRELATION," by Richard J. McConnell, which application is incorporated by reference herein.

BACKGROUND OF THE INVENTION

1. Field of the Invention

The present invention relates in general to the method used to search for and correlate with code spread signals, and in particular to a method and apparatus for reducing the calculation complexity for code acquisition and correlation in spread spectrum signals.

2. Description of the Related Art

A family of spread spectrum signals exist which are termed Code Division Multiple Access (CDMA) signals. These signals are fundamentally formed by starting with a Continuous Wave (CW) signal, and inverting the phase of the CW signal, also called a "carrier" or "carrier wave" with a pseudo random (PN) code at a specific rate for a specific length of time. The PN code is a digital code consisting of ones (1s) and zeros (0s), and the phase of the carrier is not inverted if the PN code is a "0" and is inverted if the PN code is a "1." This modulation or mixing of the PN code with the carrier wave forms a signal that has a much wider bandwidth than the original carrier, and is called a "spread signal" or "spread spectrum signal."

To receive and decode such a spread spectrum signal, the spread spectrum receiver produces a duplicate PN code that is used to invert the incoming spread spectrum signal as done in the original modulation. If the receiver PN code and the transmitted PN code line up, then the carrier wave is reconstructed in the receiver. The process of aligning the PN code generated by the receiver and the PN code that is modulated on the carrier wave is called correlation.

The process of finding where the code should be, in the industry today, is accomplished by generating a PN code at an arbitrary time, multiplying the incoming signal by the code bits (called chips) and looking for power in the result. If no power is found, then the code is shifted by one-half of a chip, and the process is repeated. This repetitive process continues until power is found, which indicates that the PN code generated at the receiver and the PN code used to modulate the carrier wave are aligned (also referred to as being correlated).

Presently, there are no attempts made to reduce the computation required to reduce the number of calculations in this repetitive process. The present approach is to mechanically step through the PN code in two-dimensions, one-half chip at a time by code position and frequency, and look for power in the result.

For example, in the Global Positioning System (GPS) Coarse/Acquisition (C/A) spread spectrum signal system, the GPS signal is formed by generating a carrier and inverting the phase with a pseudo-random signal with a chip rate of 1.023 MHz. The PN code that is generated repeats every 1.023 milliseconds, which means that there are 1023 bits of PN code before the PN code repeats. There are a number of GPS satellites using different PN codes, but transmitting at the same frequency.

If a receiver wants to receive the signal from one of these satellites, the GPS signals are received as a spread spectrum signal, and the signals need to be demodulated or "unspread." The GPS receiver converts the GPS satellite signal by centering the receiver to as close to 0 Hz as possible using standard radio processes. A local PN code is generated for the satellite of interest, and the received signal is multiplied by the local PN code. If the local PN code is a "1" the signal is not inverted, and if the local PN code is a "0" the code is inverted. Usually the satellite signal is so weak that there is no measurable output signal at this point, so the output signal is integrated to see what kind of power is being measured. If the satellite signal of interest is close enough to 0 Hz that the signal period is much greater than the integration time, a DC offset will be discernable from the integration output, e.g., if the de-spread signal is mixed to being centered at 10 Hz and an integration is appropriately performed for 1 millisecond, the average will not be zero, and the PN code of the signal has been determined and the signal correlated.

If there is no DC offset, or the DC offset is below a predetermined value, the code is shifted one-half chip, and another 1 millisecond integration is performed. Typically this is performed for all 2046 different ½ chip positions of the PN code. After 2046 one-half chip shifts the PN code repeats, so there is no need to continue, since these integrations have already been performed in the first 2046 integrations described above.

If the carrier PN code has still not been located, the center frequency of the receiver is shifted and the PN code search above is repeated. For each frequency, 2046 integrations of 1.023 milliseconds of signal are performed. If the data is sampled at 2 samples per chip, then the integration becomes an accumulation, and the 1 millisecond search means that 2046 accumulations (also known as "adds") are performed 2046 times. In essence, every data byte is multiplied by a code bit and added to an accumulated value. There is no effort to look for duplicated mathematical efforts during this accumulation/integration process.

It can be seen, then, that there is a need in the art for a method of reducing the number and complexity of operations needed to search and correlate for a CDMA signal.

SUMMARY OF THE INVENTION

To minimize the limitations in the prior art, and to minimize other limitations that will become apparent upon reading and understanding the present specification, the present invention discloses a method and apparatus for reducing the number and complexity of the calculations required to acquire and correlate a spread spectrum signal.

The present invention determines those mathematical processes that are repeated in the standard search schema, and uses this information to simplify the process by eliminating repetition of processes that have already been performed. The present information can be implemented in standard circuitry and with fewer instructions than the standard approach. As such, the present invention allows for receiver implementations that are of lower cost and lower power consumption, while achieving the same functionality as the standard receiver topology.

The present invention achieves these goals by forming a lookup table of partial accumulations, and presents a method to efficiently address these partial accumulations for use during the accumulation and correlation processes performed by the receiver. These partial accumulations are in turn added together, or accumulated, to form the total accumulation over the desired time period. This eliminates the need of a specific operation of multiplication, or equivalent, on the incoming data.

The present invention details a method for grouping similar operations, and presents a series of operations to utilize these groups for replacing a portion of the correlations and additions that would be carried out in the classical approach.

It is an object of the present invention to present a method of reducing the number and complexity of operations needed to search for and correlate a CDMA signal.

BRIEF DESCRIPTION OF THE DRAWINGS

Referring now to the drawings in which like reference numbers represent corresponding parts throughout:

FIG. 6 represents The XOR operation of the code on the data in accordance with the present invention;

FIG. 7 illustrates a look up table in accordance with the present invention.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

In CDMA systems, to receive and decode a spread spectrum signal, the spread spectrum receiver produces a PN code that is used to invert an incoming spread spectrum signal as done in the original modulation. If the receiver PN code and the transmitted PN code line up, then the correlation is completed.

Instead of mechanically stepping through the PN code one-half chip at a time, the present invention uses look-up tables and repeated values within the search algorithm to eliminate repetition in the search, and, as such, expedite the search and acquisition processes. This expedited search can be performed in both frequency and code-offset domains, and therefore expedites the correlation process dramatically. Further, smaller correlation engines may be possible with the present invention because fewer accumulations are needed in the present invention when compared to the related art.

Specifics of the Invention

Figure 1:
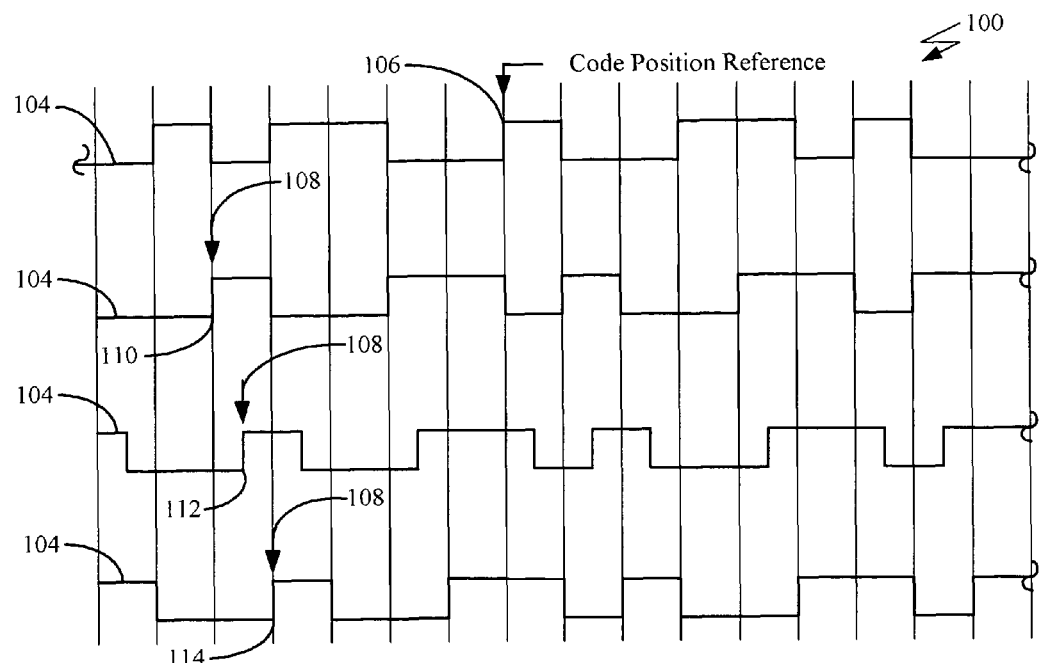
FIG. 1 illustrates how a spread spectrum shifts the code in accordance with the present invention.

FIG. 1 illustrates how a spread spectrum shifts the code in accordance with the present invention.

Timing diagram 100 shows satellite code 102 and locally generated code 104. Satellite code 102 has a reference point 106, which locally generated code 104 must correlate to for the receiver to properly interpret the satellite signals. Reference point 108 of locally generated code is initially placed at point 110, and an accumulation is performed to see if there is alignment between satellite code 102 and locally generated code 104. If not, then locally generated code 104 is shifted by a certain amount, such that reference point 108 has been shifted with respect to satellite code 102. The amount that reference point 108 has been shifted is one-half chip. Again, if there is no correlation, the reference point 108 is shifted another one-half chip, and this process is repeated until reference point 108 aligns with reference point 106.

Figure 2:
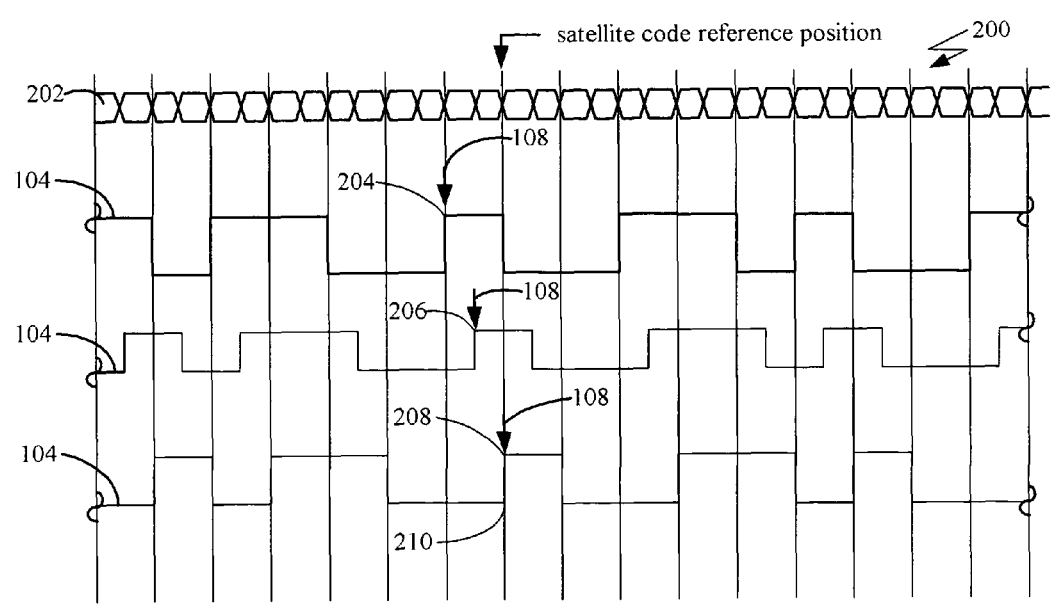
FIG. 2 illustrates the data from the receiver and the code shifting as the receiver searches for the proper code position.

FIG. 2 illustrates the data from the receiver and the code shifting as the receiver searches for the proper code position.

Timing diagram 200 illustrates receiver data stream 202 (plus noise), which has reference point 106, and local code 104 being shifted with respect to data stream 202, similar to the shift shown in FIG. 1. At a first time 204, the reference point 108 is completely misaligned with reference point 106 of data stream 202. At a second time 206, the reference point is close to alignment with reference point 106 of data stream 202, and at a third time 208, the reference point 108 is aligned with reference point 106 of data stream 202.

Figure 3:
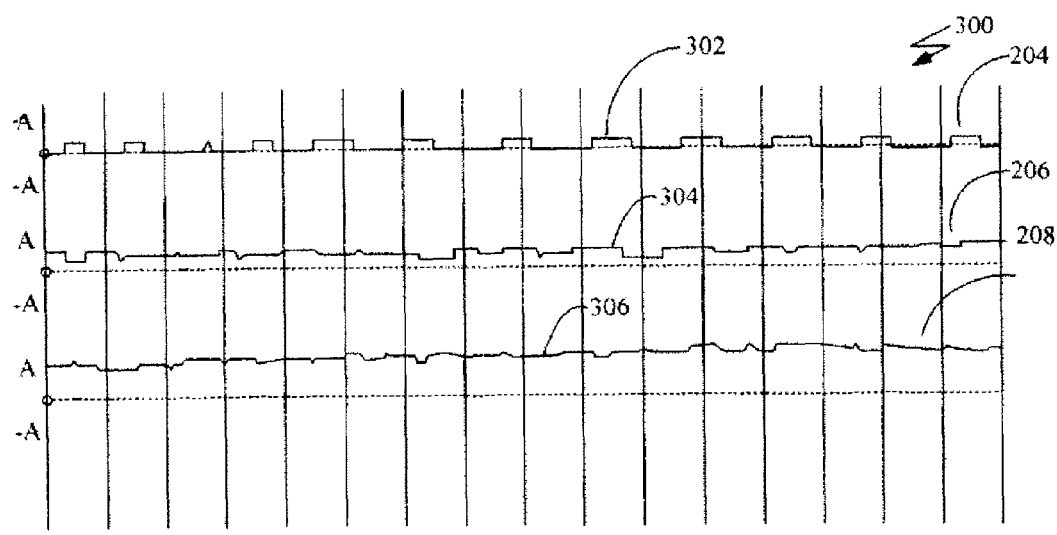
FIG. 3 illustrates the output of the accumulator when given the inputs described in FIG. 2.

FIG. 3 illustrates the output of the accumulator when given the inputs described in FIG. 2.

Output graph 300 illustrates the outputs of the accumulator at times 204-208. At time 204, where the local code and the satellite code are misaligned, the output 302 of the accumulator will be approximately zero. At time 206, the output 304 will be somewhere between zero and the maximum value, and at time 208, the output 306 will be approaching the maximum value allowed by the accumulator. This output 306 is the indication that the local code and the satellite code are correlated.

Figure 4:
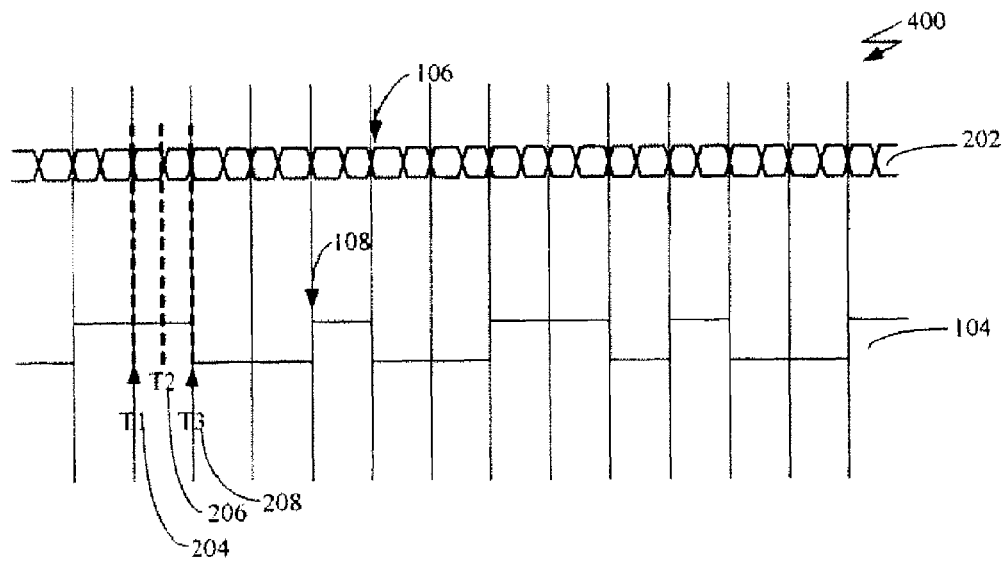
FIG. 4 illustrates the method for correlation used in the related art.

FIG. 4 illustrates the method for correlation used in the related art.

In the related art, the data 202 from T1 (time) 204 to T2 206 is XORed with the code 104 from T1 204 to T2 206. Another term is derived from this operation using the data 202 from T2 206 to T3 208 and the code 104 from T2 206 to T3 208, etc. These values are added together, typically with more values taken over a larger time period, to give an output value from the accumulator to generate the graph in FIG. 3.

Figure 5:
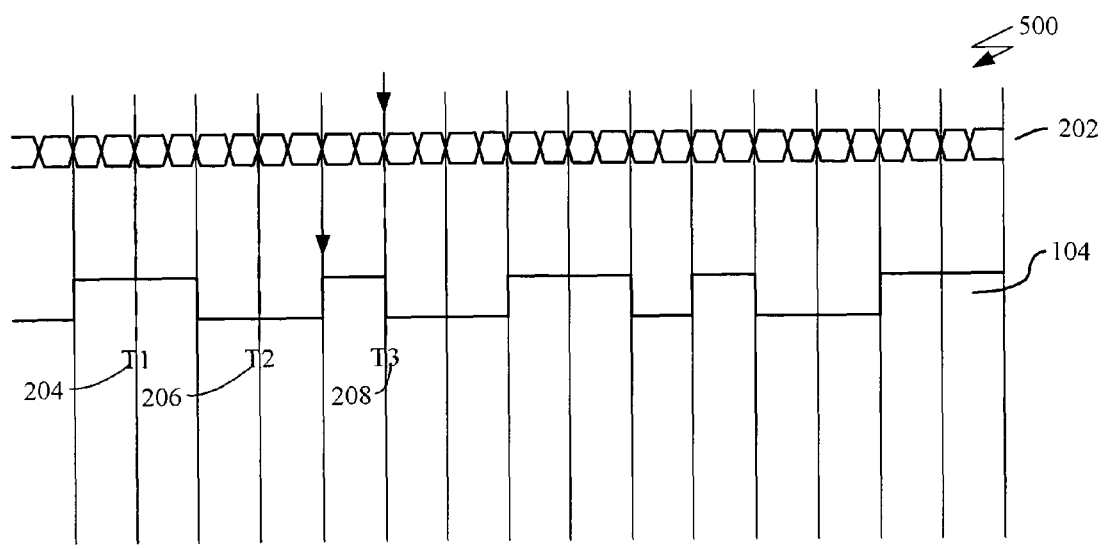
FIG. 5 illustrates the accumulation method of the present invention.
Figure 8:
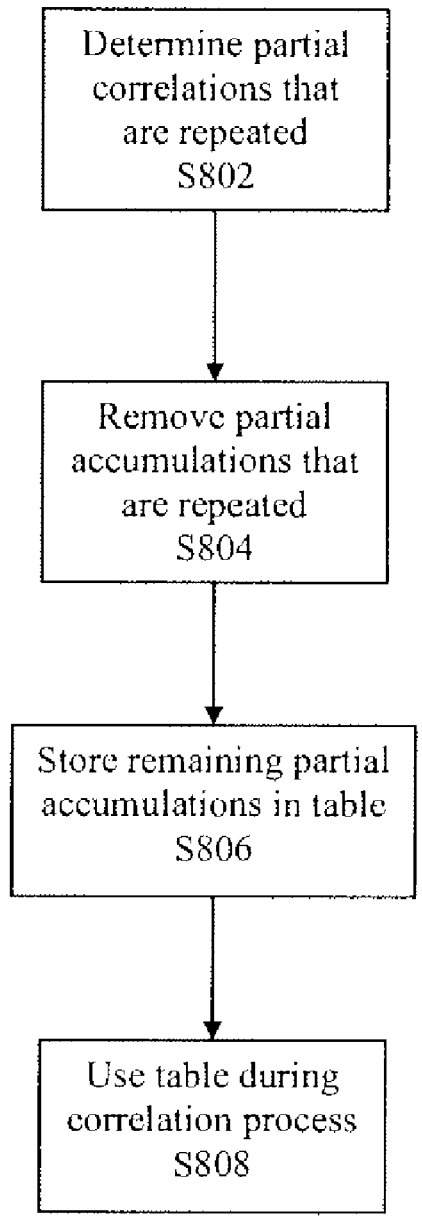
FIG. 8 is a flowchart of a method in accordance with the present invention.

FIGS. 5 and 8 illustrate an accumulation method of the present invention.

Referring first to FIG. 5, instead of accumulating byte by byte, the present invention uses a multiple byte "slice" of data 202 and code 104, e.g., a 4 byte data word and a 4 byte code word, contained between T1 204 and T2 206, and uses these values to get a partial accumulation from a partial accumulation table. Then the data 202 and code 104 between T2 206 and T3 208 are used to get another value from the partial accumulation table. These partial accumulations are added together, usually with more values taken over a larger time period, to give an output value from the accumulator.

The present invention uses the code and data in a spread spectrum receiver, such as a GPS or Satellite Positioning System (SATPS) receiver, to address a lookup table of partial accumulations to reduce the number of operations necessary to search a specified time period of data. The partial accumulations can be added together for any desired time period.

As an example, a system that uses data that comprises of 2 bits of an In phase (I) signal, and 2 bits of a Quadrature phase (Q) signal, where 2046 samples of data exist, which are 2046 samples of I and 2046 samples of Q, can be represented as:

Data={D0, D1, D2, . . . D2045}, where each D term represents 2 bits of I and 2 bits of Q.

The PN code bits can be represented as:

Code={C1, C2, C3, . . . C2045}

When the PN code operates on the data, the PN code is used to selectively invert the signal phase of that data point. With data represented as I and Q, an exclusive OR (XOR) of the data bits with the code bit will accomplish the proper inversion. The XOR operation of the code on the data is represented in FIG. 6.

The accumulation done for signal search is the sum of all the elements of the diagonals shown in FIG. 6, for example:

Accumulation for the code in position 1 (an arbitrary designation)

=D0×C0+D1×C1+D2×C2+ . . .

Accumulation for the code in position 2

=D0×C1+D1×C2+D2×C3+ . . .

There will be 2046 terms in these sums, and I and Q are summed separately.

As can be seen, there is a large amount of redundancy in the accumulations. Referring to FIG. 8, these redundancies are identified in step S802. For example, all the C terms are 1 or a 0, representing an XOR function, which make all of the columns that have C as a 1 equivalent. Similarly, all of the columns that have C as a 0 are equivalent. Since there are 2045 columns of C, and as indicated in steps S804 and S806, the redundancies are removed and the remaining code columns of the table can be reduced from 2045 to 2 columns, one column where C=0, and a second column where C=1.

With respect to the Data terms, which are four bits long, there are sixteen possible values of the D terms. As with the C columns, any row with the same D value is the same as other rows with the same D value. Thus, there are 16×2=32 possible input values to the XOR process, instead of 2045×2045 as in the related art.

FIG. 7 illustrates a look up table in accordance with the present invention.

If we use the data bits and the associated code bit to address this table we can get the XOR output without actually doing the XOR. This concept can be expanded to group together more operations without departing from the scope of the present invention.

As another example, a table can be constructed similar to the table of FIG. 7, where the top axis is 4 bits of code instead of 1 bit, and the other axis uses 4 data bytes together in a 16 bit word. Such a table is called a partial accumulation table.

Such a table contains 24 columns by 216 rows, which contains over 1 million entries. This partial accumulation table is used, for example as in step S808, by taking 4 sequential data bytes, and their 4 corresponding code bits, and address the table for the partial accumulation of these terms. To accumulate for a specific period, the resulting partial accumulations are simply added together.

It is desirable to perform a similar function with a smaller table. If the data is represented by I and Q forms, the I and Q terms must be accumulated separately. The above table for 4 elements would require each entry consisting of a separate I partial accumulation, and a separate Q accumulation.

In As such, a separate table can be constructed for the I terms. Each data word has 2 bits of I and 2 bits of Q, so 4 consecutive terms of I have a total of 256 possible values. The 4 bits of code have 16 possible values, so a table of 256×16 elements is determined that are the partial accumulations. This table replaces the over 1 million element table described above, which dramatically reduces the computations required to correlate, since all of the Q terms are represented in the I table without any additional entries in the partial accumulation table of the present invention.

To use the partial accumulation table we take the I terms from 4 consecutive data words, and the associated 4 code bits, and look up the partial accumulation. This should result in getting the 2046 I code words accumulated in one-quarter of the operations needed in the classical case. The same functions are performed for the Q terms.

In this invention there is no limitation to the size or form of the partial accumulation table. Data and Code may be represented in many forms, the above description is meant to illustrate the concept, not to limit the concept by how the code, data, or partial accumulations are represented.

CONCLUSION

In summary, the present invention discloses a method and apparatus for reducing the number and complexity of the calculations required to acquire and correlate a spread spectrum signal.

The present invention determines those mathematical processes that are repeated in the standard search schema, and uses this information to simplify the process by eliminating repetition of processes that have already been performed. The present information can be implemented in standard circuitry and with fewer instructions than the standard approach. As such, the present invention allows for receiver implementations that are of lower cost and lower power consumption, while achieving the same functionality as the standard receiver topology. The present invention achieves these goals by forming a lookup table of partial accumulations, and presents a method to efficiently address these partial accumulations for use during the accumulation and correlation processes performed by the receiver. These partial accumulations are in turn added together, or accumulated, to form the total accumulation over the desired time period. This eliminates the need of a specific operation of multiplication, or equivalent, on the incoming data. The present invention details a method for grouping similar operations, and presents a series of operations to utilize these groups for replacing a portion of the correlations and additions that would be carried out in the classical approach.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A method for reducing a number of calculations required to correlate an incoming spread spectrum signal received by a GPS receiver and encoded with a pseudorandom code, comprising:

determining, for the spread spectrum signal, partial accumulations that are repeated in a correlation process of the spread spectrum signal using a data slice of the spread spectrum signal made up of in phase (I) signal data and quadrature phase (Q) signal data correlated with pseudorandom codes, wherein the data slice of the spread spectrum signal includes a plurality of data bytes and a plurality of pseudorandom code bytes;

removing at least a portion of the partial accumulations that are repeated in the correlation process of the I signal and the Q signal data with the pseudorandom codes and results in remaining partial accumulations in the correlation process;

storing the remaining partial accumulations in at least one table that is accessible by the GPS receiver; and using, by the GPS receiver, the data slice to look up a corresponding accumulation value in the at least one table during the correlation process to determine when a locally generated pseudorandom code and the incoming pseudorandom code received at the GPS receiver are correlated, wherein the at least one table is constructed for one of the terms of the spread spectrum signal.

2. The method of claim 1, wherein a portion of the locally generated code and a portion of the incoming pseudorandom code are used to determine correlation of the locally generated code and the incoming pseudorandom code.

3. The method of claim 2, wherein the incoming spread spectrum signal is a Satellite Positioning System (SATPS) signal.

4. The method of claim 3, wherein the SATPS signal is a Global Positioning System (GPS) signal.

5. The method of claim 4, wherein the at least one table is addressed using at least one data bit of the GPS signal and at least one associated code bit of the GPS signal.

6. The method of claim 1, wherein the data bytes are represented by In-phase (I) and Quadrature phase (Q) forms.

7. The method of claim 1, wherein the data slice includes a 4 byte data word and a 4 byte code word.

8. The method of claim 1, wherein the data slice is used to retrieve a first partial accumulation value from the at least one table.

9. The method of claim 8, wherein a plurality of following data slices are used to retrieve a plurality of subsequent partial accumulation values during a predetermined time period from the at least one table and the subsequent partial accumulation values are added to the first partial accumulation value to produce an accumulator output value.

10. The method of claim 9, wherein the locally generated pseudorandom code and the incoming pseudorandom code are correlated when the accumulator output value is at a predetermined maximum value.

* * * * *

UNITED STATES PATENT AND TRADEMARK OFFICE
CERTIFICATE OF CORRECTION

| | | |
|---|---|---|
| PATENT NO. | : 7,920,620 B1 | Page 1 of 1 |
| APPLICATION NO. | : 09/967136 | |
| DATED | : April 5, 2011 | |
| INVENTOR(S) | : McConnell | |

It is certified that error appears in the above-identified patent and that said Letters Patent is hereby corrected as shown below:

Title Page, Item (63), delete "Continuation of" and insert -- Provisional application --, therefor.

In Column 4, Line 63, delete "1" and insert -- I --, therefor.

In Column 5, Line 54, delete "In As such," and insert -- As such, --, therefor.

Signed and Sealed this
Nineteenth Day of March, 2013

Teresa Stanek Rea
*Acting Director of the United States Patent and Trademark Office*